United States Patent
Osorio Sánchez et al.

(10) Patent No.: US 11,553,816 B2
(45) Date of Patent: Jan. 17, 2023

(54) DEVICE FOR PREPARING INFUSIONS

(71) Applicant: INNOVATION CRAFT COMPANY, S.L., Valencia Aldaya (ES)

(72) Inventors: Miguel Osorio Sánchez, Valencia Aldaya (ES); Héctor Poyatos Rodas, Valencia Aldaya (ES)

(73) Assignee: INNOVATION CRAFT COMPANY, S.L., Valencia Aldaya (ES)

( * ) Notice: Subject to any disclaimer, the term of this patent is extended or adjusted under 35 U.S.C. 154(b) by 579 days.

(21) Appl. No.: 16/494,534

(22) PCT Filed: Aug. 2, 2017

(86) PCT No.: PCT/ES2017/070566
§ 371 (c)(1),
(2) Date: Sep. 16, 2019

(87) PCT Pub. No.: WO2018/178412
PCT Pub. Date: Oct. 4, 2018

(65) Prior Publication Data
US 2020/0008612 A1 Jan. 9, 2020

(30) Foreign Application Priority Data

Mar. 28, 2017 (ES) .............................. ES201730354U

(51) Int. Cl.
*A47J 31/54* (2006.01)
*A23F 5/26* (2006.01)
(Continued)

(52) U.S. Cl.
CPC ............... *A47J 31/547* (2013.01); *A23F 5/26* (2013.01); *A47J 31/06* (2013.01); *A47J 36/027* (2013.01)

(58) Field of Classification Search
CPC ........ A47J 31/547; A47J 31/06; A47J 36/027; A23F 5/26
(Continued)

(56) References Cited

U.S. PATENT DOCUMENTS 4,386,109 A  5/1983  Bowen et al.
5,028,753 A  7/1991  Shariat
(Continued)

FOREIGN PATENT DOCUMENTS

EP    383439        8/1990
ES    1141483 U  *  7/2015  .............. A47J 31/00

OTHER PUBLICATIONS

Machine Translation of ES1141483U; Mar. 2022 (Year: 2022).*
International Search Report issued in PCT/ES17/70566 dated Dec. 15, 2017.

*Primary Examiner* — Tu B Hoang
*Assistant Examiner* — Thomas J Ward
(74) *Attorney, Agent, or Firm* — Niels Haun; Dann, Dorfman, Herrell & Skillman, P.C.

(57) ABSTRACT

The invention describes a device for preparing infusions, suitable for preparing infusions in a micro wave. The device comprises: a lowertank transparent to electromagnetic radiation, with a valve; an upper tank screwed to the lower tank; a funnel that connects the tanks; an extraction area containing material to be extracted with filtering means; a cover; and means for making the device leak tight, the device comprising areas for shielding against electromagnetic waves in the extraction area, the upper tank and the cover. In the preferred embodiments, the device comprises a float, needles and thermal reinforcement areas. The device allows infusions to be obtained without the volatile compounds degrading.

5 Claims, 7 Drawing Sheets

(51) Int. Cl.
*A47J 31/06* (2006.01)
*A47J 36/02* (2006.01)

(58) Field of Classification Search
USPC .................................. 99/287, 297, 299, 322
See application file for complete search history.

(56) References Cited

U.S. PATENT DOCUMENTS

| | | | | |
|---|---|---|---|---|
| 5,884,551 | A | * | 3/1999 | Orrico ........................ A23F 5/26 |
| | | | | 426/433 |
| 2002/0148356 | A1 | * | 10/2002 | Lazaris ............... A47J 31/3638 |
| | | | | 99/302 R |
| 2004/0020922 | A1 | | 2/2004 | Alves |
| 2005/0204925 | A1 | | 9/2005 | Orrico et al. |
| 2011/0274922 | A1 | * | 11/2011 | Yasue ..................... B32B 27/36 |
| | | | | 428/354 |
| 2015/0173562 | A1 | * | 6/2015 | Priley .................. A47J 31/407 |
| | | | | 99/283 |

\* cited by examiner

FIG. 1
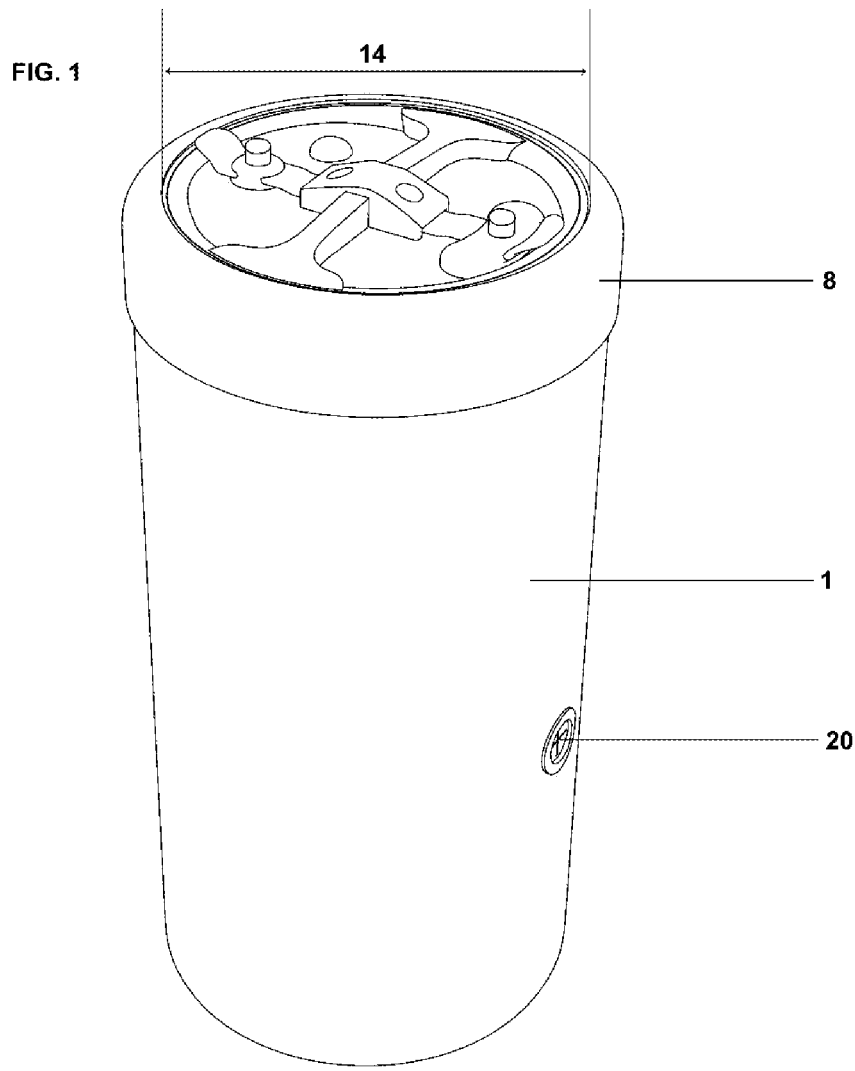
FIG. 24
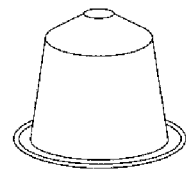
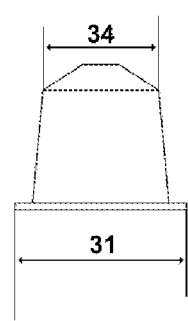
FIG. 24a
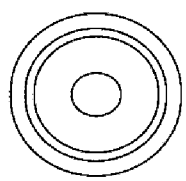
FIG. 24b
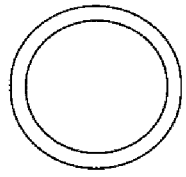
FIG. 24c

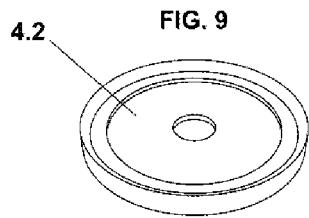
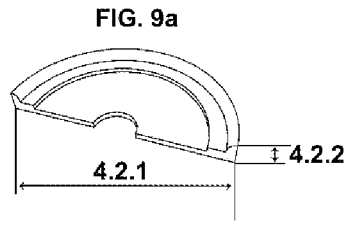
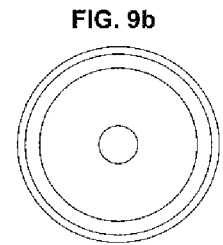
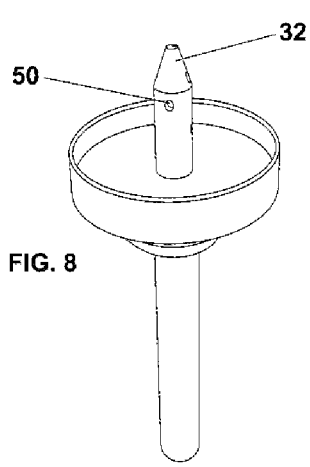
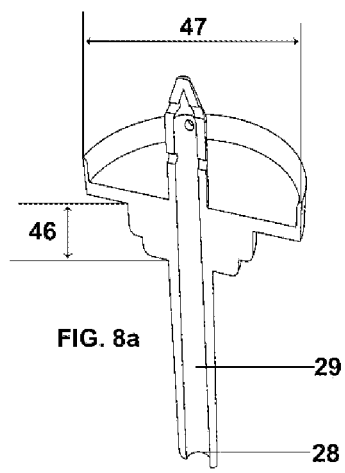
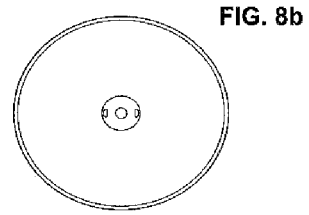
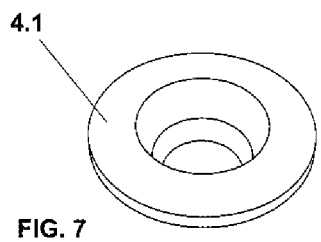
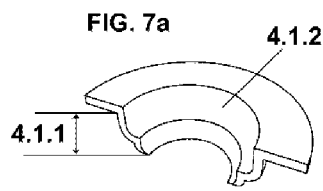
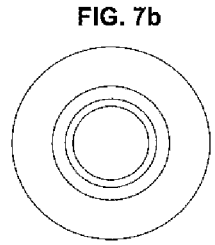
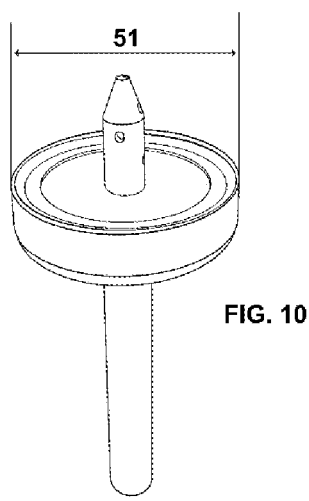

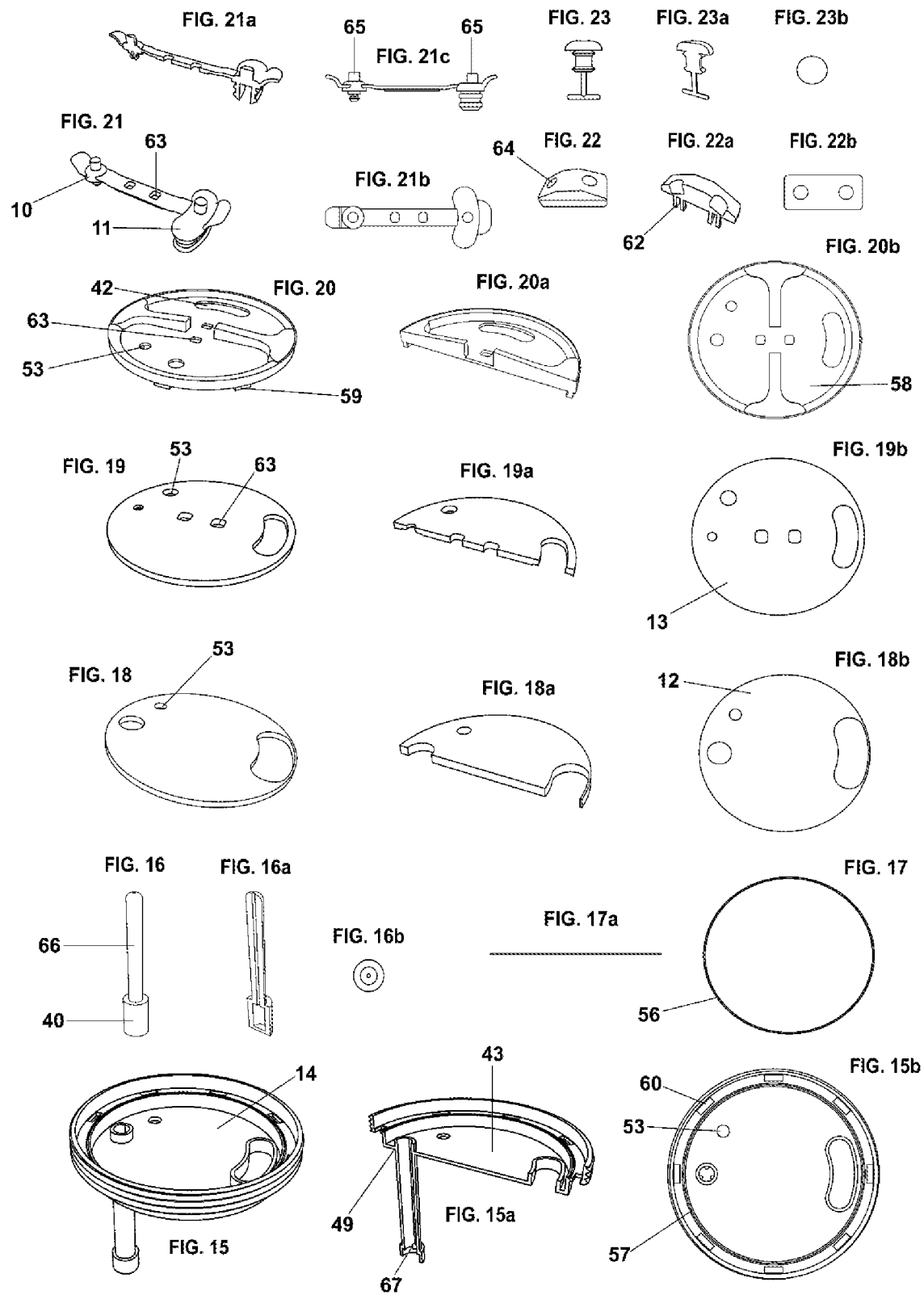

DEVICE FOR PREPARING INFUSIONS

PRIORITY APPLICATIONS

This application is a 371 application of International Application No. PCT/ES2017/070566 filed Aug. 2, 2017, which claims priority to Spanish Patent Application No. U201730354 filed Mar. 28, 2017. Each of the foregoing applications is hereby incorporated herein by reference.

TECHNICAL FIELD OF THE INVENTION

The present invention describes a device for preparing infusions by ascending ducts. The device is characterized in that it contains a shielding that reflects the electromagnetic waves. The device described in the invention is suitable for preparing infusions in microwave.

BACKGROUND OF THE INVENTION

It is known that the preparation of infusions is carried out by the vapour-liquid extraction of the solid to be extracted (coffee, tea, mate, chamomile, aromatic herbs . . . ). A stream of extractant fluid (liquid or vapour) penetrates the extraction area that contains the bed of the solid to be extracted and flows into a condensation tank that stores the infusion.

The extraction process requires that the fluid temperature be close to the boiling temperature of the extractant liquid in order to obtain the maximum performance in the extraction and to be able to extract all the compounds from the solid, especially the volatile compounds that are responsible for the aromas of the infusions. On the other hand, the higher the fluid pressure, the better the extraction of volatile compounds. In addition, it is necessary that the temperature of the infusion in the condensation tank is not high because volatile compounds would degrade. In addition, a high temperature in the extraction area carbonizes the material to be extracted. Finally, it is recommended that the infusion once prepared is at a temperature around 40° C.

The state of the art describes different methods for preparing infusions:
- by ascending ducts through which the hot extracting fluid is taken to the upper container in which the solid to be extracted is located,
- by a liquid stream under pressure that pierces and passes through a capsule containing the solid to be extracted.
- by immersing the solid to be extracted in a single container.

Extraction by a stream of a liquid is carried out at a pressure comprised between 6-15 bar to extract volatile compounds, but it has the disadvantage that the infusion falls into an open container and the infusion cools rapidly. This procedure to obtain infusions requires specific devices for each type of capsule. In addition, it should be avoided that channels are formed in the bed of the solid to be extracted. On the other hand, it is common that, due to poor cleaning, fungi and yeasts grow on the seal.

The devices used for the extraction by means of ascending ducts have a metallic lower tank wherein the extraction fluid that heats up to the boiling temperature is introduced. When the fluid reaches the boiling temperature, the energy source must be cut to prevent the carbonisation of the solid to be extracted and the degradation of volatile compounds. However, the infusion obtained cools rapidly and an auxiliary container is needed to pour the infusion. These devices work under pressure at a pressure comprised between 1-1.2 bars. The prepared infusion is at a temperature comprised between 60-80° C. The infusion must be cooled to be drunk.

The document closest to the invention describes an device suitable for preparing infusions in a microwave made of a material transparent to electromagnetic radiation, but the quality of the infusions is of poor quality because the infusion obtained is overheated losing the volatile components responsible for aroma of the infusion, and has an unpleasant taste.

OBJECT OF THE INVENTION

The problem solved by the present invention is to find a suitable device for preparing infusions in a microwave and that prevents the degradation of volatile components. That is, the present invention allows improving the flavour and aroma of the infusions.

The solution found by the inventors is a leak tight device that allows obtaining a pressure of the extracting fluid greater than 1.5 bar without increasing the temperature of the upper tank or condenser and in the extraction area. The described device comprises a shielding that reflects the electromagnetic radiation in the extraction area and in the condensation tank, in this way the energy of the electromagnetic radiation is transmitted only to the lower tank or boiler.

Another problem solved by the invention is that the infusion can be drunk directly in the device without using another container because the upper tank is not heated.

The described device is suitable for extracting any solid, such as tea, chamomile, mate, vanilla, coffee, etc. The material to be extracted is in the extraction area and can be conditioned in filters or capsules.

In a preferred mode, the device comprises a thermal shielding in the cover, in the extraction area and in the upper condensing tank. Thermal shielding prevents the infusion from cooling.

In a preferred mode, the described device is suitable for extracting solids conditioned in capsules. In this embodiment, the extraction area comprises a seal that seals the lower tank and through which the capsule is inserted, means for punching and pressing the capsule and filtering means.

In a more preferred mode, the means for punching and pressing the capsule are a needle located at the top of the funnel that connects the tanks and a circular piece with at least 3 legs ending in a tip. This embodiment allows the device to be used for most of the capsules on the market, regardless of its geometry and the manufacturer.

In another embodiment, the device comprises a screw cap provided with a float that allows knowing the amount of infusion obtained.

DESCRIPTION OF THE INVENTION

The extraction device described in the invention is formed by: a lower tank (1) transparent to electromagnetic radiation (1.4) with a safety valve (3), an upper tank (8) screwed to the lower tank (1), a funnel (5) that connects the upper and lower tanks, an extraction area containing material to be extracted with filtering means, a cover (14) and means for making the device leak tight. In addition, the upper tank (8), the extraction area and the cover (14) contain shieldings 1.2 and 13 that reflect the electromagnetic radiation.

The lower tank (1) is filled with water, and in the extraction area with which it communicates, the material (37) to be extracted (coffee, tea, chamomile, aromatic herbs, etc.) is introduced. The device is closed with a tight cover. The device is placed in a microwave (38) to prepare the infusion (27).

As illustrated in FIG. 3, shieldings 1.2 and 13 reflect the electromagnetic radiation (1.4) generated by the microwave. The waves (1.4) reflected again, are reflected now by the inner walls of the microwave, finally impacting the lower tank (1) that absorbs the radiation causing the water to heat up. In this way, the water heats up more quickly than in the documents cited in the prior art, without causing any heating in the extraction area or the upper tank (8).

The means for shielding electromagnetic radiation are metal sheets with a thickness comprised between 0.2-1 millimetre, such as ferrites, steel, aluminium. In a preferred mode, the shielding is a 0.5 mm steel sheet.

Transparent materials to electromagnetic radiation are known to the person skilled in the art and can be ceramics, glass, Teflon, poly amides. In a preferred mode, the lower tank (1) is made of Teflon.

The pressure reached in the lower tank (1) is comprised between 2.4-2.8 bar. The water-vapour at a temperature between 90-95° C. extracts the solids from the extraction area, passes through the funnel (5) and is stored in the upper tank (8). The temperature of the prepared infusion (27) has a temperature comprised between 40-50° C., which allows it to be drunk directly.

In a preferred embodiment, the device contains thermal shieldings (12) in the cover and in the upper tank (1.1). The thermal shieldings allow taking the device without being burned and maintaining the infusion at a temperature around 40° C.

In a preferred embodiment, the extraction area comprises a seal (33) that seals the upper tank (8) and through which the capsule (6) is introduced, means for punching and pressing the capsule (6) and the filter (6.1). In a more preferred mode, the means for punching and pressing the capsule (6) are a needle (32) located at the top of the funnel that connects the tanks and a circular piece (6.2) with at least 3 legs (6.3) that end in a tip. This embodiment allows the device to be used for most of the capsules on the market, regardless of its geometry and the manufacturer.

In a preferred mode, the cover (14) contains a float (40) that detects the volume of prepared infusion (27) in real time, when the device is inside the microwave (38) in operation.

DESCRIPTION OF THE FIGURES

FIG. 1 shows a non-exploded perspective view, of the invention, in assembled state.

FIG. 7 shows a perspective view of bottom seal of funnel of FIG. 8.

FIG. 7a shows a cut-longitudinally perspective view of the bottom seal of FIG. 7, of the funnel of FIG. 8.

FIG. 7b shows a top view of the bottom seal of FIG. 7, of the funnel of FIG. 8.

FIG. 8 shows a perspective view of the funnel.

FIG. 8a shows a cut-longitudinally perspective view of the funnel of FIG. 8.

FIG. 8b shows a top view of the funnel of FIG. 8.

FIG. 9 shows a perspective view of the upper seal of the funnel of FIG. 8.

FIG. 9a shows a cut-longitudinally perspective view of the upper seal of FIG. 9, of the funnel of FIG. 8.

FIG. 9b shows a top view of the upper seal of FIG. 9, of the funnel of FIG. 8.

FIG. 10 shows a perspective view of the funnel of FIG. 8 with the bottom seal of FIG. 7, and the upper seal of FIG. 9.

FIG. 11 a shows a cut-longitudinally perspective view of the bottom seal of FIG. 11 of the upper tank of FIG. 14.

FIG. 11 b shows a side view of the bottom seal of FIG. 11 of the upper tank of FIG. 14.

FIG. 11 c shows a top view of the bottom seal of FIG. 11 of the upper tank of FIG. 14.

FIG. 15 shows a perspective view of the cover of upper tank of FIG. 14.

FIG. 15a shows a cut-longitudinally perspective view of the cover of FIG. 15 of the upper tank of FIG. 14.

FIG. 15b shows a top view of the cover of FIG. 15 of the upper tank of FIG. 14.

FIG. 16 shows a perspective view of the float of the cover of FIG. 15.

FIG. 16a shows a cut-longitudinally perspective view of the float of the cover of FIG. 15.

FIG. 16b shows a top view of the float of the cover of FIG. 15.

FIG. 17 shows a perspective view of the O-ring of the cover of FIG. 15.

FIG. 17a shows a side view of the O-ring of FIG. 17 of the cover of FIG. 15.

FIG. 18 shows a perspective view of the shielding of the cover of FIG. 15.

FIG. 18a shows a cut-longitudinally perspective view of the shielding of FIG. 18 of the cover of FIG. 15.

FIG. 18b shows a top view of the shielding of FIG. 18 of the cover of FIG. 15.

FIG. 19 shows a perspective view of the thermal seal of the cover of FIG. 15.

FIG. 19a shows a cut-longitudinally perspective view of the thermal seal of FIG. 19 of the cover of FIG. 15.

FIG. 19b shows a top view of the thermal seal of FIG. 19 of the cover of FIG. 15.

FIG. 20 shows a perspective view of the closing cover of the cover of FIG. 15.

FIG. 20a shows a cut-longitudinally perspective view of the closing cover of FIG. 20 of the cover of FIG. 15.

FIG. 20b shows a top view of the closing cover of FIG. 20 of the cover of FIG. 15.

FIG. 21 shows a perspective view of the plugs of the cover of FIG. 15.

FIG. 21a shows a cut-longitudinally perspective view of the plugs of FIG. 21 of the cover of FIG. 15.

FIG. 21b shows a top view of the plugs of FIG. 21 of the cover of FIG. 15.

FIG. 21c shows a side view of the plugs of FIG. 21 of the cover of FIG. 15.

FIG. 22 shows a perspective view of the closing cover of the plugs of FIG. 21.

FIG. 22a shows a cut-longitudinally perspective view of the closing cover of FIG. 22 of the plugs of FIG. 21.

FIG. 22b shows a top view of the closing cover of FIG. 22 of the plugs of FIG. 21.

FIG. 23 shows a perspective view of the safety cap of the cover of FIG. 15.

FIG. 23a shows a cut-longitudinally perspective view of the safety cap of FIG. 23 of the cover of FIG. 15.

FIG. 23b shows a top view of the safety cap of FIG. 23 of the cover of FIG. 15.

FIG. 24 shows a perspective view of the coffee or tea capsule.

FIG. 24a shows a cut-longitudinally side view of the coffee or tea capsule of FIG. 24.

FIG. 24b shows a top view of the coffee or tea capsule of FIG. 24.

FIG. 24c shows a bottom view of the coffee or tea capsule of FIG. 24.

PREFERRED EMBODIMENT OF THE INVENTION

Figure 2:
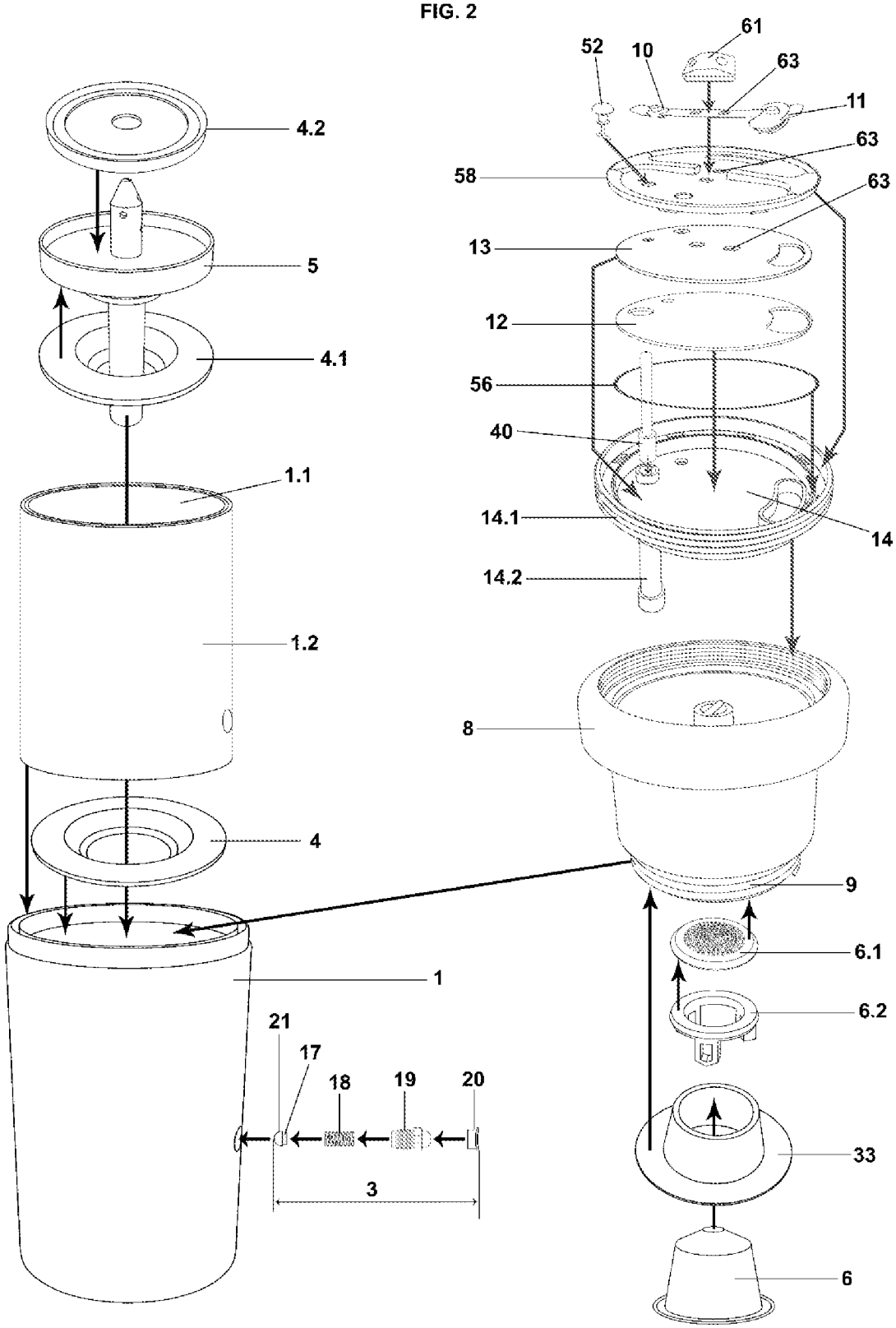
FIG. 2 shows an exploded perspective view of an embodiment of the device, according to the invention.
Figure 3:
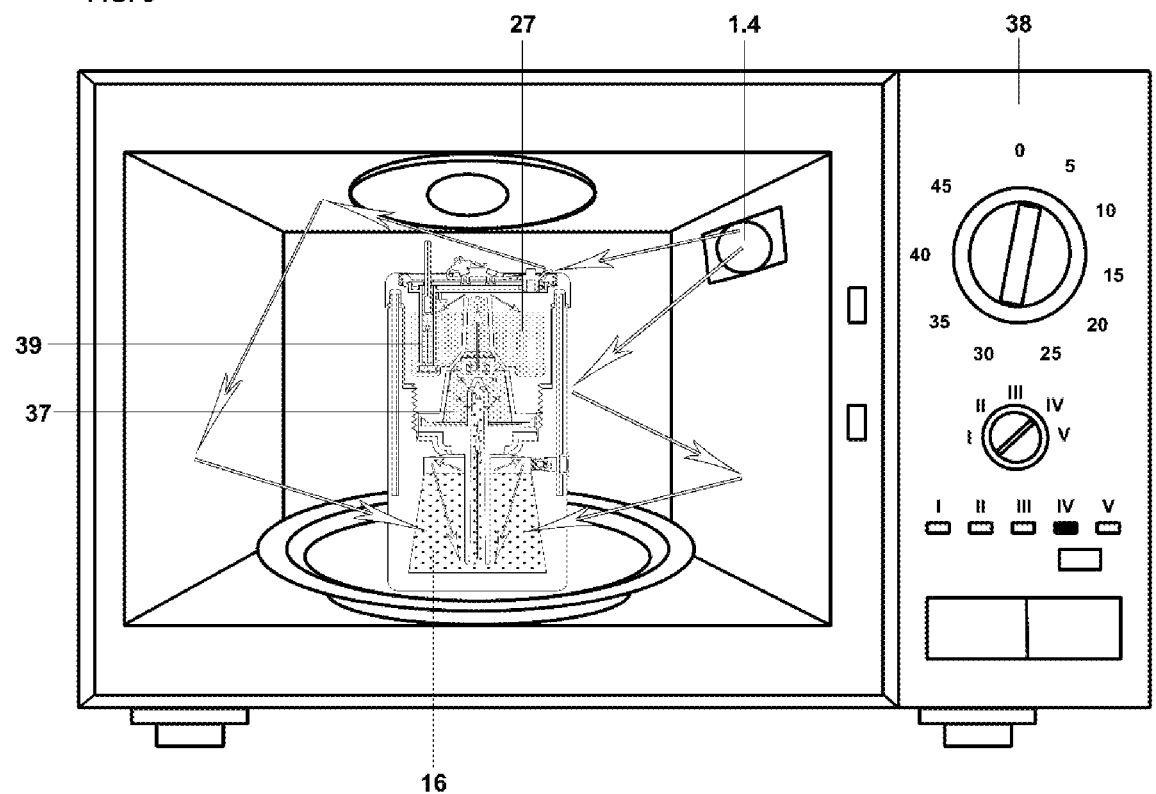
FIG. 3 shows a cut-longitudinally perspective view of the invention of FIG. 1, in the assembled state, inserted inside the microwave.
Figure 4:
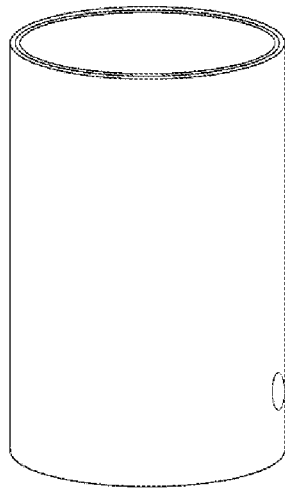
FIG. 4 shows a perspective view of the shielding and the thermal seal of the water tank.
Figure 4A:
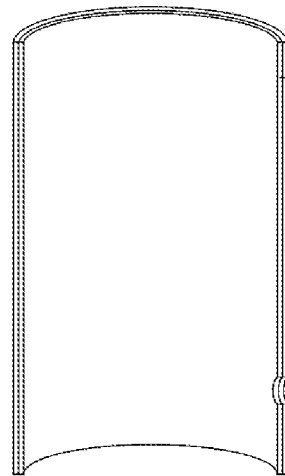
FIG. 4a shows a cut-longitudinally perspective view of the shielding and thermal seal of FIG. 4.
Figure 4B:
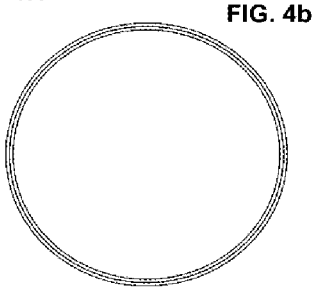
FIG. 4b shows a top view of the shielding and thermal seal of FIG. 4.
Figure 5:
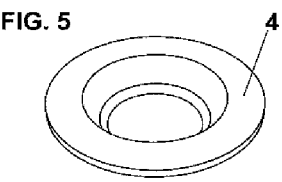
FIG. 5 shows a perspective view of the bottom seal of the water tank.
Figure 5A:
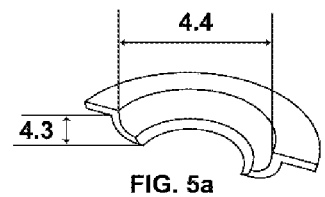
FIG. 5a shows a cut-longitudinally perspective view of the bottom seal of FIG. 5.
Figure 5B:
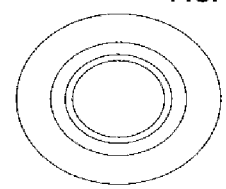
FIG. 5b shows a top view of the bottom seal of FIG. 5.
Figure 6:
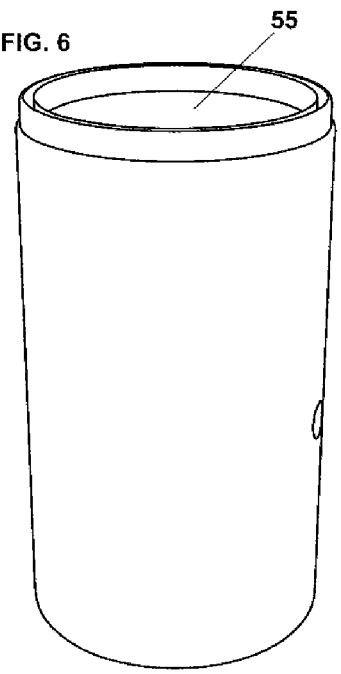
FIG. 6 shows a perspective view of the water tank.
Figure 6A:
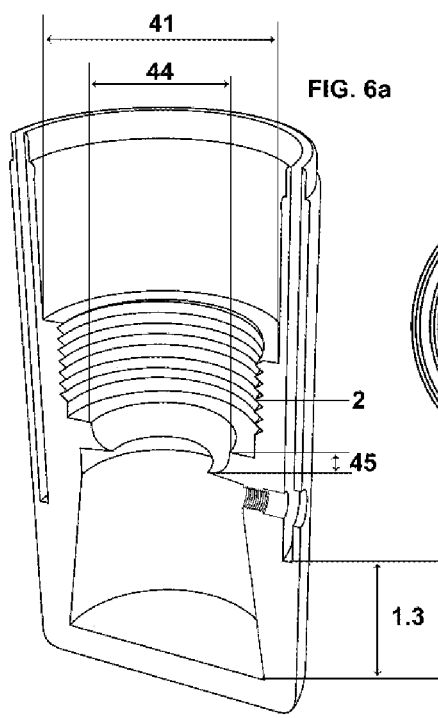
FIG. 6a shows a cut-longitudinally perspective view of the water tank of FIG. 6.
Figure 6B:
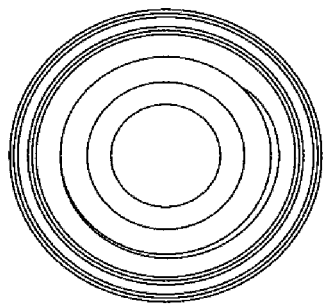
FIG. 6b shows a top view of the water tank of FIG. 6.
Figure 14:
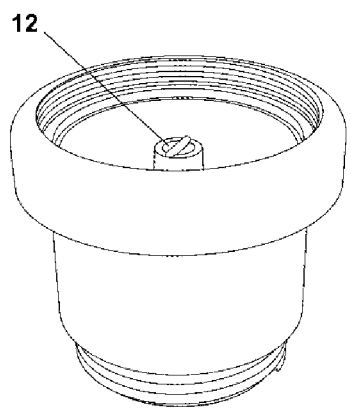
FIG. 14 shows a perspective view of the upper tank.
Figure 14A:
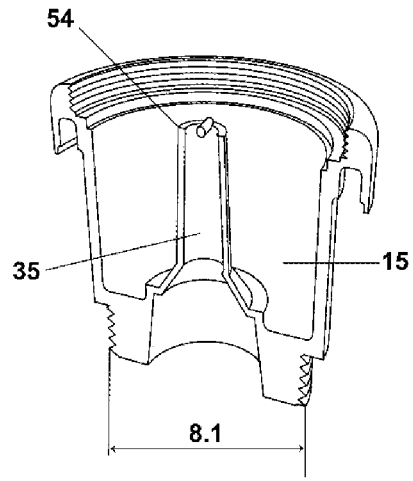
FIG. 14a shows a cut-longitudinally perspective view of the upper tank of FIG. 14.
Figure 14B:
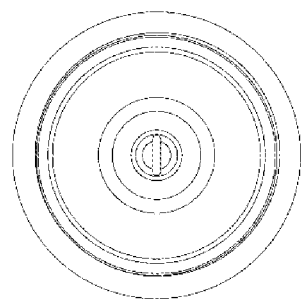
FIG. 14b shows a top view of the upper tank of FIG. 14.
Figure 13:
FIG. 13 shows a perspective view of the filter of the upper tank of FIG. 14.
Figure 13A:
FIG. 13a shows a cut-longitudinally perspective view of the filter of the upper tank of FIG. 14.
Figure 13B:
FIG. 13b shows a top view of the filter of the upper tank of FIG. 14.
Figure 12:
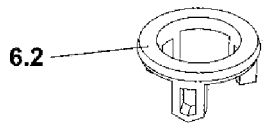
FIG. 12 shows a perspective view of the circular piece that presses and punches the capsule of FIG. 24.
Figure 12A:
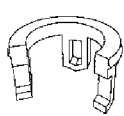
FIG. 12a shows a cut-longitudinally perspective view of the circular piece that presses and punches the capsule of FIG. 24.
Figure 12B:
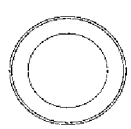
FIG. 12b shows a top view of the circular piece that presses and punches the capsule of FIG. 24.
Figure 12C:
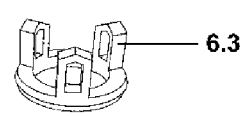
FIG. 12c shows a bottom perspective view, of the circular piece that presses and punches the capsule of FIG. 24.
Figure 11:
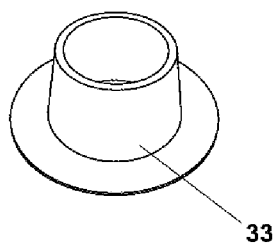
FIG. 11 shows a perspective view of the bottom seal of the upper tank of FIG. 14.
Figure 11A:
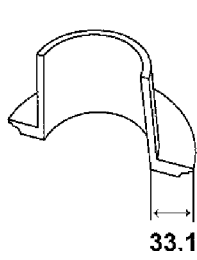
Figure 11B:
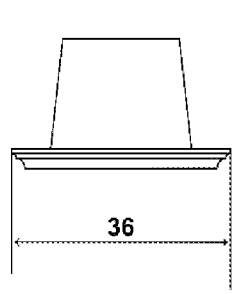
Figure 11C:
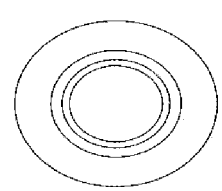

In FIGS. 1 to 3, the invention is shown featuring an embodiment of the device, according to the invention.

In the figures, it is appreciated that this invention has a lower tank (1) of water (16), into which the water (16) is introduced, which must be heated by microwave (38), equipped with thermal shielding (1.1) arranged to avoid burning when the tank is gripped by hand and mouth, after use, shielding (1.2) placed to protect the inside of the water tank (1) against electromagnetic waves (1.4), leaving the lower area (1.3) without protection where electromagnetic waves (1.4) heat up the water (16), a safety valve (3) comprised of a stem (17), a spring (18), a hollow screw (19) and a cover (20) arranged to prevent the pressure inside the lower tank (1) from exceeding a specific maximum value, in the event that the specific maximum pressure is exceeded inside the tank (1) of water (16), the pressure inside the tank (1) will generate a force greater than that exerted by the spring (18) of the valve (3) against the stem head (21) moving the stem (17) outside the safety valve (3), allowing vapour to enter the screw (19), exiting through the final hole, going towards the cover (20) allowing the pressure to be released outside the device, until the pressure inside the tank (1) drops to normal levels, the spring force (18) of the safety valve (3) being greater than the pressure inside the tank (1) moving the stem head (21) into the screw (19), blocking the vapour outlet, regulating the pressure of the tank (1) of water (16), on which a tank (8) of infusion is screwed, in which the coffee infusion (27) is accumulated.

Both tanks (1 and 8), are separated by a funnel (5), which is introduced by the inlet port of the hole of thread (2), which is mounted in the upper part of the narrowing (44), located in the lower tank (1), which has a concave portion (45), fitting perfectly with the lower part of the seal (4) having a convex portion (4.3), fitting perfectly with the top of the seal (4) having a concave portion (4.4), with the seal (4.1) having a convex lower shape (4.1.1), fitting perfectly with the top of the seal (4.1) having a concave portion (4.1.2), with the lower part of the funnel (5) having a convex portion (46), the top of the funnel (5) having a concave portion (47), fitting perfectly with the lower part of the seal (4.2) with a convex portion (4.2.1) sealing the lower tank (1), having a fixed and sealed portion (41).

The coffee pod or capsule (6) is fitted in the seal (33), located internally to the screw (9), of the upper tank (8) of infusion, and that of the seal (4.2) having an upper portion (4.2.2), fitting perfectly with the seal (33), having a lower portion (33.1), with the peculiarity that said seal (33) fits perfectly with the measurements of the pod (6), fitting its upper portion (34) towards the outlet duct (35) of the tank (8), the filter (6.1) acting with needles (6.3), leaving the lower portion (31) of the capsule (6), located in the inlet port (36), present in the seal (33) of the upper tank (8).

Screwing the screw (9) of the upper tank (8) of infusion, with the thread (2) of the tank (1), generates a force, between the lower area of the area (8.1), of the tank (8), and the upper area (51) of the funnel (5), introducing the upper area (51) into the capsule (6), by means of the needle (32), with perforations (50), sealing the lower portion (31) of the pod (6), at the same time, it has a compression between the upper area (45) of the internal narrowing (44) of the tank (1), and the upper part (51) of the funnel (5), by means of the seal (4.2) of the funnel (5), fitting perfectly with the seal (33) having a convex lower portion (36) that seals the upper tank (8) of infusion (27).

The funnel (5) is formed by an open lower inlet (28), which connects the water (16) of the tank (1) to the duct (29), which conducts the water (16) to the needle (32) where said flow is distributed, inside the coffee capsule (6), by lower portion (31) thereof, by means of a needle (32) with perforations (50), located, in the central point of upper part (51) of the funnel, and the needle (32) with perforations (50), drains the water (16) inside the coffee capsule (6) through the portion (31), wetting the substance (37) it contains inside, a filter (6.1), and a ring (6.2) with needles (6.3), located in the outlet duct (35), punches, presses and filters, depending on the capsule (6) inserted in the seal (33) located in the tank (8), making the infusion (27) therein, said infusion (27) coming out through the upper portion (34) of the capsule (6), towards the outlet duct (35) of the deposit (8), draining the infusion (27) inside (15) of the tank (8) through end holes (12).

The upper tank (8) has a cover (14) in the upper part, connected by means of the upper thread (8.2) of the tank (8) and the screw (14.1) of the cover (14), it has a spoon (14.2), whose placement is located in the lower area (49) of the cover (14), in order to mix the infusion (27) with another substance that is added to the upper tank (8), a button (10) that activates the infusion meter (39) placed in the lower part (49) of the cover, formed by a float (40) located inside the spoon (14.2), also a button (11) that uncovers a hole (42) that lets the infusion (27) pass outside, helping to drink directly from the device, inside it has a thermal seal (12) that allows drinking directly from the device without burning the lips after use, located in the inner portion (43) of the cover (14), a shielding (13) that protects the inside of the upper tank (8) against electromagnetic waves, located in the inner portion (43) of the cover (14), connected by means of a connection to the safety cap (52), located transversely to the piece in an upright position, which will ascend upwards leaving a hole (53) free that will release the pressure in the case when it is too high inside the tank of infusion, the plug (52) is activated again when it is introduced by the same hole (53), being fixed and sealed. An O-ring (56), located in the portion (57) internally seals the cover (14), when the closing cover (58) is embedded by means of clips (59) in the areas (60) of the cover (14), leaving the cover fixed and watertight. A closing cover (61) is embedded by clips (62) by means of the holes (63), leaving both the button (10) of the indicator (39) and the drinking button (11) fixed. Upper recesses (64) of the closing cover (61) help in holding the button (10) of the indicator (39) and the drinking button (11), by means of a surplus (65) thereof.

To prepare an infusion (27) of coffee, or another substance, an adequate amount of water (16) is introduced into the upper tank (8) without exceeding the area (54) thereof, pouring said quantity of water (16) inside the tank (1) through the upper area (55), the level being below the valve (3), the funnel (5) is inserted, with the bottom seal (4.1), upper seal (4.2) and with the seal (4), inside the water tank (1) (16), the coffee capsule (6) is embedded, in the seal (33) of the upper infusion tank (8), it is screwed the screw (9), of the infusion tank (8), on the thread (2) of the tank (1), sealing the invention, and then presses the button (10) of the indicator (39) of infusion level (27), and drinking button (11), fixing the surplus (65) with the upper recesses (64) of the closing cover (61) of cover (14), introducing the invention inside the microwave (38), applying medium heat or medium-high heat.

The water (16) from the tank (1) is heated, increasing the pressure, which drives part of the water (16) from the tank (1) upward through the lower inlet (28) of the funnel (5), the flow (16) entering the internal duct (29), directing the water (16), towards the needle (32), which distributes the water (16), inside the coffee capsule (6), by means of the needle (32), with perforations (50), until it comes into contact with coffee (37), or another substance, impregnating it and extracting the infusion (27), by means of the ring (6.2) by the upper portion (34) of the capsule (6), filtering the infusion (27) the filter (6.1) and leading it towards the outlet duct (35) of the upper tank (8), leading to the infusion (27), inside (15) of the Infusion tank (8), by means of end holes (12), the mast (66) of the float (40) reports the quality and quantity of infusion (27), by entering the infusion (27) through the inlet (67) located in the bottom of the spoon (14.2) obtaining in real time in the tank (8) the quantity and quality of infusion that is being generated.

Due to the effect of heat, and consequently, an increase in pressure and temperature inside the tank (1), a thermal shielding (1.1) is exhibited, which in the tank (1) and a thermal shielding (12) in the cover (14), allowing the extraction of the invention from the microwave, after a certain time interval, and drinking directly, from the button (11) of the cover (14) of the upper tank (8), the coffee infusion (27) by a solid-liquid-vapour extraction by microwave (38).

In the extraction phase, the infusion flow (27) produced inside the capsule (6) is filtered through the ring (6.2) through the upper portion (34) of the capsule (6), filtering the filter (6.1) the infusion (27) and leading it towards the outlet conduit (35) of the upper tank (8), leading to the infusion (27) inside (15) of the tank (8), through end holes (12).

In this way, it is avoided that the beverage fraction obtained by the solid-liquid-vapour extraction, is mixed with impurities in said process, also the thermal shields 1.1 and 12 and the shielding (1.2) of the tank (1) with the shielding (13) of the cover (14), protects the interior of the invention from electromagnetic waves (1.4) and high temperatures, obtaining an infusion of coffee, or another substance of first quality, allowing drinking from the same device.

Having described sufficiently the invention as well as the way to be carried out in practice, it should be noted that the provisions indicated and described above in the attached drawings are subject to modifications in detail as long as they do not alter its fundamental principle.

Example 1

110 ml of water were introduced into the lower tank and the device was placed in a microwave with 350 W power. After 70 seconds the water began to rise through the funnel. The pressure reached in the lower tank was 2.67 bar and a temperature of 95° C. The material used in the lower tank was Teflon and the shielding material against electromagnetic radiation was a 0.5 mm-thick steel sheet.

All embodiments detailed in the claims detailed below are part of the description.

The invention claimed is:

1. Device for preparing infusions comprising:
   a lower tank (1) transparent to electromagnetic radiation (1.4) with a pressure safety valve (3),
   an upper tank (8) screwed to the lower tank (1) using a screw (9) on the upper tank and a thread (2) on the lower tank to receive the screw,
   an extraction area, comprising:
      a capsule (6) with the material to be extracted disposed therein, the capsule having a base at one end and an upper portion at an opposing end to the base,
      a seal (33) that seals the upper tank (8) to the capsule (6),
      a filter (6.1) having a circular piece (6.2) disposed between the capsule and upper tank, the circular piece having at least 3 legs each leg ending in a leg needle (6.3) for piercing the upper portion of the capsule (6),
      a funnel (5) disposed between the upper and lower tanks, the funnel including a funnel needle (32) suitable for punching and pressing through the base of the capsule, the funnel needle including perforations (50) disposed therein, and the funnel including a lower inlet (28) disposed in the lower tank to receive liquid therefrom, the funnel needle thereby disposed in fluid communication with the lower tank to direct liquid from the lower tank into the capsule;
   a cover (14) screwed to the upper tank (8),
   a shield (1.2) against electromagnetic waves (1.4) in the extraction area and the upper tank (8), and
   a shield (13) against electromagnetic waves disposed in the cover.

2. The device according to claim 1, wherein the cover (14) and upper tank (8) comprise a thermal shield (12.1.1).

3. The device according to claim 1, wherein the cover (14) has a float (40).

4. The device according to claim 1, wherein the shield against electromagnetic radiation (1.4) is a steel sheet with a thickness comprised between 0.2-1 mm.

5. The device according to claim 1, wherein the material transparent to electromagnetic radiation is Teflon.

* * * * *